United States Patent [19]

Krabbenhoft et al.

[11] Patent Number: 5,021,521

[45] Date of Patent: Jun. 4, 1991

[54] PROCESS OF REACTING BRANCHED THERMOPLASTIC POLYCARBONATE WITH POLYHYDRIC PHENOL HAVING MORE THAN TWO HYDROXY GROUPS

[75] Inventors: Herman O. Krabbenhoft; Eugene P. Boden, both of Scotia, N.Y.

[73] Assignee: General Electric Company, Schenectady, N.Y.

[21] Appl. No.: 455,057

[22] Filed: Dec. 22, 1989

Related U.S. Application Data

[63] Continuation-in-part of Ser. No. 297,380, Jan. 17, 1989, Pat. No. 4,888,400.

[51] Int. Cl.$^5$ .............................................. C08G 64/42
[52] U.S. Cl. .................................. 525/462; 525/467; 528/204
[58] Field of Search .................. 525/462, 467; 528/204

[56] References Cited

U.S. PATENT DOCUMENTS

| | | | |
|---|---|---|---|
| Re.27,682 | 6/1973 | Schnell et al. | 260/47 |
| 3,541,049 | 11/1970 | Cleveland | 260/47 |
| 3,799,953 | 3/1974 | Freitag et al. | 260/395 |
| 4,185,009 | 1/1980 | Idel et al. | 260/45.9 |
| 4,431,793 | 2/1984 | Rosenquist | 528/198 |
| 4,465,820 | 8/1984 | Miller et al. | 528/194 |
| 4,469,861 | 9/1984 | Mark et al. | 528/196 |
| 4,605,731 | 8/1986 | Evans et al. | 528/371 |
| 4,650,852 | 3/1987 | Evans et al. | 528/371 |
| 4,727,134 | 2/1988 | Brunelle et al. | 528/371 |
| 4,888,400 | 12/1989 | Boden et al. | 528/204 |

*Primary Examiner*—Harold D. Anderson
*Attorney, Agent, or Firm*—William H. Pittman; James C. Davis, Jr.

[57] ABSTRACT

Thermoplastic branched polycarbonate resins are prepared by equilibration of linear aromatic polycarbonate with polyhydric phenol having more than two hydroxy groups in the presence of a catalyst.

In another aspect of the invention, thermoplastic branched polycarbonate resins are prepared by equilibration of branched aromatic polycarbonate with polyhydric phenol having more than two hydroxy groups per molecule, preferably 1,1,1-tris-(4-hydroxyphenyl)ethane, in the presence of a carbonate equilibration catalyst, preferably tetrabutylammonium tetraphenylborate.

7 Claims, No Drawings

PROCESS OF REACTING BRANCHED THERMOPLASTIC POLYCARBONATE WITH POLYHYDRIC PHENOL HAVING MORE THAN TWO HYDROXY GROUPS

This application is a continuation-in-part of application Serial No. 297,380, filed Jan. 17, 1989, now U.S. Pat. No. 4,888,400.

The present invention relates to branched polycarbonate compositions and a method for preparing them. More particularly, the present invention relates to branched polycarbonate compositions having high melt strength properties and to a method for preparing these compositions from conventional grades of linear polycarbonates or branched polycarbonates.

Polycarbonates are well known high performance engineering thermoplastics characterized by many advantageous physical properties, such as high optical clarity, toughness, dimensional stability and excellent impact strength over a wide temperature range.

Polycarbonate resins suitable for use in blow molding applications such as the production of hollow articles of large volume and large panels are required to have additional advantageous physical properties of high melt strength (high shape retention) and high shear sensitivity characteristics such as a melt index ratio greater than about 2.0 and a complex viscosity ratio greater than about 3.0. In order to achieve such properties, polycarbonates with a critical degree of branching are required.

It is known that branched polycarbonates, for example, bisphenol-A ("BPA") polycarbonates, which exhibit high melt strength properties and are thus suitable for blow-molding applications, can be prepared by a heterogeneous interfacial polymerization of the polycarbonates. The use of polyhydric phenols having three or more hydroxy groups per molecule, for example, 1,1,1-tris-(4-hydroxyphenyl)-ethane (THPE), 1,3,5-tris-(4-hydroxyphenyl)-benzene, 1,4-bis-(4', 4'''-dihydroxy-tri-phenylmethyl)-benzene and the like, as branching agents for high melt strength blow-moldable polycarbonate resins prepared interfacially has been described in U.S. Pat. Nos. Re 27,682 and 3,799,953.

Other methods known to prepare branched polycarbonates through heterogeneous interfacial polymerization methods include the use of cyanuric chloride as a branching agent (U.S Pat. No. 3,541,049); branched dihydric phenols as a branching agents (U.S. Pat. No. 4,469,861); and 3,3-bis-(4-hydroxyaryl)-oxindoles as branching agents (U.S. Pat. No. 4,185,009). Additionally, aromatic polycarbonates end-capped with branched alkyl acyl halides and/or acids and said to have improved properties are described in U.S. Pat. No. 4,431,793.

Such interfacial polymerization processes as described above are typically conducted in a mixed aqueous-organic system which results in recovery of the polycarbonate in the organic phase. Usually a dihydric phenol is reacted with a carbonate precursor in the presence of a chain terminating or molecular weight controlling agent wherein the branching agent is employed as a comonomer in the preparation of a branched polycarbonate.

Blow-moldable grade, branched polycarbonates possessing properties of high melt strength and the like prepared in such interfacial polymerization methods, however, are typically specialty products which require a plant to stop making conventional grades of linear polycarbonate, thus hindering plant flexibility and increasing production costs in their manufacture.

In the interfacial processes presently used to prepare branched polycarbonates, the branching agent is used in an amount sufficient to obtain the proper melt rheological properties, i.e., $R^*$ of 3.6–3.9, for current applications. Increasing the level of branching agent and decreasing the level of capping agent could lead to a resin with a higher $R^*$ value. However, this may also lead to higher solution viscosities, which would effectively restrict the final molecular weight and other properties of the branched polycarbonates, and create problems of handling the product solutions. Adjusting the branching and endcapping levels to suit individual needs may cause problems in cross contamination and require excessive purging between different grades. It is desirable, therefore, to provide a more efficient means for varying the branching and endcapping levels according to need.

It is thus an object of the present invention to provide an alternative method for the preparation of branched polycarbonates possessing properties of high melt strength and shear sensitivity which does not involve interfacial polycondensation methods.

Another object of this invention is to provide a method for modifying the melt properties of conventional linear polycarbonate resin in order to provide a resin suitable for use in blow molding applications.

Another object of the invention is to provide a method for extruder processing of linear polycarbonate to produce blow molding grade polycarbonate resin from standard grade resin.

It is also an object of the present invention to provide a method for preparing branched polycarbonates having improved melt strength properties from commercially available branched polycarbonates.

SUMMARY OF THE INVENTION

In accordance with the present invention a novel and improved method is provided wherein conventional grades of linear polycarbonates can be conveniently employed as starting materials in the preparation of blow-moldable branched polycarbonates possessing the requisite physical properties of high melt strength and shear sensitivity.

The present invention thus provides a process for the preparation of a thermoplastic, branched-chain, high melt strength, polycarbonate which comprises contacting a linear polycarbonate substrate polycarbonate with a polyhydric phenol having more than two hydroxy groups in the presence of a catalytic amount of a carbonate equilibration catalyst.

As will be appreciated by persons skilled in the art, the subject invention thus provides a convenient process for the preparation of blow-moldable branched polycarbonates heretofore manufactured as special-order products. By the process of this invention, conventional linear non-branched polycarbonates can be converted to the branched polycarbonates. A wide variety of linear non-branched polycarbonate resins may be employed. Commercially available linear polycarbonates can be used to conveniently and effectively produce materials with a range of melt rheological characteristics.

In another aspect of the present invention, commercially available branched aromatic polycarbonate resins may also be used to prepare the branched polycarbonates of this invention.

The present invention is more fully illustrated by the following detailed description.

DETAILED DESCRIPTION OF THE INVENTION

The thermoplastic branched polycarbonates according to the process of the present invention are obtained by contacting a preformed, non-branched, linear aromatic polycarbonate with a polyhydric branching agent having more than two hydroxy groups per molecule in the presence of a catalytic amount of a suitable carbonate equilibration catalyst.

Linear polycarbonates useful in this invention include any of the several aryl polycarbonates which can be obtained commercially, or prepared by any of the usual procedures, for example, by reacting a dihydroxy aromatic compound with a phosgene in an interfacial polymerization process.

Typical of some dihydroxy aromatic compounds suitable for the preparation of linear aryl polycarbonate useful as starting materials herein are described in U.S. Pat. Nos. 4,727,134, the entire disclosure of which is incorporated herein by reference.

Dihydroxy aromatic compounds of the bisphenol-A type, and especially, bisphenol-A, are often preferred for their particular suitability in preparing linear aryl polycarbonate resins useful for purposes of the present invention.

In the event an aryl polycarbonate copolymer rather than a homopolymer is desired for use in the preparation of the branched aromatic carbonate polymers herein, two or more different dihydroxy aromatic compounds or a copolymer of a dihydroxy aromatic compound with a glycol or with hydroxy or acid terminated polyester, or with a dibasic acid may be employed in the preparation thereof Further, blends of aryl polycarbonate homopolymer with any of the above-described materials to provide the aryl polycarbonate substrates may be employed herein.

Carbonate precursors which can be used for production of the linear aryl polycarbonates useful as substrates herein are well known and described, for example, in U.S. Pat. Nos. 4,469,861 and 4,431,793, illustrative examples of such precursors include carbonyl halides, diaryl carbonate esters or haloformates. The carbonyl halides can be carbonyl chloride, carbonyl bromide and mixtures thereof. Typical of the diaryl carbonate esters which can be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate and the like, di-(alkylphenyl) carbonate, di-(chloronaphthyl) carbonate, phenyl tolyl carbonate, chlorophenyl chloronaphthyl carbonate, and the like, or mixtures of any of the foregoing. The haloformates suitable for use herein include mono- or bis-haloformates of dihydric phenols, for example, bischloroformates of hydroquinone, monochloroformate of bis-phenol-A, etc., or bishaloformates of glycols, for example, bishaloformates of ethylene glycol, neopentyl glycol, polyethylene glycol, etc. While other carbonate precursors will occur to those skilled in the art, carbonyl chloride, also known as phosgene, is generally preferred.

In utilizing the interfacial polymerization process to prepare aryl polycarbonate resin, the dihydroxy aromatic compounds are dissolved in an alkali metal salt solution, for example, sodium hydroxide, and a water-immiscible solvent, such as, for example, methylene chloride, dichloroethane or chlorobenzene, is added After introducing the carbonate precursor, for example, phosgene, at room temperature, the polycarbonate intermediates are then isolated directly from the organic phase by distilling off the solvent or by precipitation.

The chain length of the particular polycarbonate product substrates and thus the desired molecular weight can be adjusted and regulated by adding a chain terminating agent or chain stopper to the reaction mixture to obtain a viscosity of a predetermined value. Such chain stoppers are in most cases a monofunctional phenol, such as, for example, phenol m- and p-methylphenol, m- and p-ethylphenol, m- and p-propylphenol, m- and p-isopropylphenol, m-bromophenol, p-butylphenol, para-tertiary-butylphenol and p-cumylphenol. The addition of the agent is usually made initially prior to the addition of the carbonate precursor, but can be made at any time up to the point of reaction where the degree of polymerization approaches that of a high polymer.

The quantity of chain terminating agent which can be added to prepare the linear aryl polycarbonate resins particularly suited for the preparation of the blow-moldable grade of branched polycarbonates in accordance herewith is an amount effective to prepare substrates having a number average molecular weight of about 6,000 to about 50,000. This amount will vary as a function of the mole percent of aromatic dihydroxy compound employed in the reaction. As will be appreciated by those skilled in the art in the preparation of polycarbonate product substrates herein having the desired properties, the addition of such necessary chain terminating agents will not be influenced or hindered by the addition of branching agents.

As mentioned previously herein, branched aromatic polycarbonate resins may also be used as the starting resin material for preparation of the branched polycarbonates of this invention.

Any of the commercially available branched aromatic polycarbonate resins may be used in this invention such as those disclosed, for example, in U.S. Pat. Nos. 3,541,049; 4,469,861; 4,185,009; 4,431,793; 3,799,953; and Re.27,682, all of which are incorporated by reference herein in their entirety.

Commercially available branched polycarbonate resins are prepared in interfacial polymerization processes wherein, typically, a polyhydric phenol having more than two hydroxy groups in the molecule is reacted with an aromatic dihydroxy compound and carbonic acid derivative in the presence of a chain terminating or molecular weight controlling agent Suitable polyhydric phenols are disclosed in the references cited above and include, for example, 1,1,1-tris-(4-hydroxyphenyl)-ethane (THPE), 1,3,5 tris-(4-hydroxyphenyl)-benzene, 1,4 bis-(4', 4"-dihydroxy-triphenylmethyl)-benzene and the like. Other examples of suitable branching agents include cyanuric chloride, branched dihydric phenols such as those disclosed in U.S. Pat. No. 4,469,861, above cited and incorporated by reference herein, 3,3-bis-(4-hydroxyaryl)oxindoles, and aromatic polycarbonates end-capped with branched alkyl acyl halides and/or acids, such as those disclosed, for example, in U.S. Pat. No. 4,431,793, also above cited and incorporated by reference herein.

Another suitable branching agent is trimellitic triacid chloride For purposes of this invention, commercially available branched polycarbonates prepared using trimellitic triacid chloride are preferred for use in the present invention.

The aromatic dihydroxy compounds, carbonate precursors, and chain terminating or molecular weight controlling agents recited previously herein for use in the preparation of linear aromatic polycarbonates are also suitable for preparation of the branched aromatic polycarbonate starting material.

The branched aromatic polycarbonate starting material typically has a number average molecular weight of about 6000 to about 50,000.

In accordance with the process of the present invention conversion of the aforesaid linear aromatic polycarbonate resin to branched chain polycarbonate is effected by contacting the resin with a polyhydric branching agent having more than two hydroxy groups per molecule in the presence of a catalytic amount of a suitable carbonate equilibration catalyst.

In the same way, the branched polycarbonate resins of this invention may also be prepared from the commercially available aromatic branched polycarbonate resins described above by contacting the conventional resin with a polyhydric branching agent having more than two hydroxy groups per molecule in the presence of a catalytic amount of a suitable carbonate equilibration catalyst.

Without intending to limit the scope of the present invention to any theory or reaction mechanism, it is believed that the reaction is initiated by the formation in situ of a reactive phenoxide from reaction of the equilibration catalyst with the polyhydric branching agent which can thereafter readily undergo an addition reaction with electrophillic carbonate carbon atoms on the linear polycarbonate backbone causing chain scission to form a lower molecular weight fragment and a branched aromatic polycarbonate. It is further believed that the reaction continues until equilibration is attained and a product having a new molecular weight distribution and which has shorter branched chains than the linear aromatic or branched aromatic polycarbonate substrate is formed.

Polyhydric phenols suitable as branching agents in the present invention include any triol or tetrol or higher hydroxy substituted polyhydric phenol, for example, 1, 1, 1 -tris-(4- hydroxyphenyl)ethane (or 4,4', 4''-ethylidyne trisphenol or THPE); 1,3,5-tris-(2-hydroxyethyl) cyanuric acid ([1,3,5-tris-(2-hydroxyethyl)-1,3,5-triazine-2,4,6-(1H, 3H, 5H)-trione]; 4,6-dimethyl-2,4,6-tri-(4-hydroxyphenyl)-heptane-2; 2,2-bis-4,4-(4,4''-dihydroxyphenyl)-cyclohexyl propane; 1,3,5-trihydroxybenzene (phloroglucinol)); 1,2,3-trihydroxybenzene (pyrogallol); and 1,4-bis-(4'4''-dihydroxytriphenyl-methyl)-benzene. Such compounds and examples of additional polyhydric phenols suitable for use herein and their method of preparation are described, for example, in U.S. Pat. Nos 3,799,953 and Re. 27,682.

Other commercially available polyhydric phenols useful herein include, for example, 2', 3', 4'-trihydroxyacetophenone; 2,3,4-trihydroxybenzoic acid; 2,3,4-trihydroxybenzophenone; 2,4,4'-trihydroxybenzophenone; 2', 4', 6'-trihydroxy-3-((4-hydroxyphenyl)propiophenone; (phloretin); pentahydroxyflavone; 3,4,5-trihydroxyphenylethylamine (5-hydroxydopanine); 3,4-trihydroxyphenethyl alcohol; 2,4,5-trihydroxypyrimidine (isobarbituric acid); tetrahydroxy-1, 4-quinone hydrate (tetrahydroxy-1,4'-benzoquinone); 2,2', 4,4'-tetrahydroxybenzophenone; and 1,2,5,8-tetrahydroxyanthraquinone (quinalizarin).

Of course, a mixture of two or more of such polyhydric phenols may be employed to achieve particularly desired properties of branched polycarbonate.

While other polyhydroxy phenols suitable for the practice of the present invention will occur to those skilled in the art, 1,1,1-tris-(4-hydroxyphenyl) ethane or THPE is preferred as the compound is readily available at competitive cost.

The term "catalysts" as used herein includes compounds which function as conventional catalysts and compounds which undergo chemical changes and function as conventional initiators or promoters.

Suitable carbonate equilibration catalysts include various bases and Lewis acids, and in general, any of those catalysts known for effecting polymerization of cyclic polycarbonate oligomers such as described in U.S. Pat. Nos. 4,650,852 and 4,605,731.

Illustrative examples of bases include lithium 2,2,2-trifluoroethoxide, n-butyllithium, tetramethylammonium hydroxide, and various weakly basic salts such as sodium benzoate and lithium stearate Examples of useful Lewis acids include dioctyltin. oxide, triethanolamine titanium isopropoxide, tetra(2-ethylhexyl) titanate and polyvalent metal chelates such as aluminum acetylacetonate, bisisopropoxy titanium bisacetylacetonate, and the bisisopropoxy aluminum salt of ethyl acetoacetate.

Particularly useful as carbonate equilibration catalysts herein are coordination compounds such as those described in above mentioned U.S. Pat. Nos. 4,650,852 and 4,605,731 and employed therein as polycarbonate formation catalysts. Such a class of basic catalyst compounds is preferred in the practice of the present invention as they are able to generate phenoxides upon contact with the polyhydric phenol branching agents thus providing strong nucleophiles which can readily undergo an addition reaction with the substrate electrophillic carbon atoms in the manner discussed previously.

Illustrative examples of such preferred catalysts include tetrabutylammonium tetraphenylborate, tetramethylammonium tetraphenylborate, lithium tetraphenylborate, sodium tetraphenylborate, sodium bis-2,2'-biphenyleneborate, potassium tetraphenylborate, tetramethylphosphonium tetraphenylborate, tetra-n-butylphosphonium tetraphenylborate and tetraphenylphosphonium tetraphenylborate.

The choice of any particular catalyst selected is not critical to the practice of this invention, thus the use herein of such catalysts described above or similar catalysts may depend upon such factors as their thermal stability, the desired rate of reaction and the chemical nature of the particular linear polycarbonate and branching agents employed. Tetrabutylammonium tetraphenylborate, however, is particularly preferred because of its high activity.

Preparation of the branched aryl polycarbonates in accordance with this invention can be effected by dry mixing the above-described reagents prior to their reaction, for example, by melt condensation in a Helicone at temperatures ranging from about 250° C. to about 350° C., for approximately 5 to 30 minutes, or by dry mixing the reagents and continuously feeding the mixture through an extrusion device at temperatures ranging from about 200° C. to about 350° C. The thermoplastic branched-chain polycarbonate is prepared by melt condensation at a temperature of from about 200° C. to about 350° C. for about 1 to about 30 minutes.

In general equilibration is permitted to proceed for a period of time sufficient to achieve the desired melt properties in the product branched resin.

Generally, the level of polyhydric branching agent is not critical to the practice of the present invention as varying the level of branching agent will effect the number of branching sites and the average branched polycarbonate chain length For example, low levels of branching agents will produce few branching points with relatively long chains, and higher levels will increase the number of branching points, but will decrease the average length of the chains. The amount of branching agent, therefore, will depend upon the various properties of particular branched polycarbonates desired and end uses contemplated. In the preparation of blow-moldable polycarbonate resins, however, it is preferred to employ levels of branching agent ranging from about 0.1 to about 2.0 mole percent based on molecular weight and the amount of linear polycarbonate or branched polycarbonate resin in the reactor.

In similar manner, the amount of carbonate equilibration catalyst employed herein is not critical to the practice of the invention, as such amount may depend upon the particular catalyst employed, the reaction rate desired, e.g. the rate at which the branching reaction reaches equilibrium and a stable branched polycarbonate product is obtained, the chemical nature of the particular substrate and branching agent employed, and the particular properties of various branched polycarbonates desired and end uses contemplated. Depending on such variables, an effective amount of catalyst can easily be determined for the preparation of a particular branched polycarbonate without undue experimentation. It is thus preferred that when borate-containing initiators are employed in the preparation of blow-moldable, high melt strength branched chain polycarbonates, the amounts thereof should range from about 0.01 to about 0.1 mole percent based upon the amount of linear polycarbonate or branched polycarbonate substrate present.

In the process according to the invention, it is also possible to include adjuvants of all kinds at any stage before, during or after the preparation of the branched aryl polycarbonates. Examples which may be mentioned in this context include fire retardants, dyestuffs, pigments, mold release agents, stabilizers against the action of moisture, heat and UV, lubricants and fillers, such as glass powders, quartz products, graphite, molybdenum sulphide, metal powders, powders of higher-melting plastics, for example, polytetrafluoroethylene powder, natural fibers, such as cotton, sisal and asbestos, and also glass fibers of very diverse kinds, metal filaments and fibers which are stable when present in the melt of the polycarbonates and do not significantly damage the polycarbonates.

The thermoplastic, branched-chain polycarbonates obtained according to the invention preferably have melt rheological properties comprising a melt index ratio (MIR) of at least 2.0 and a complex viscosity ratio (R*) of at least 3.0 and a number average molecular weight of from about 5,000 to about 20,000. Further, the branched-chain polycarbonates obtained preferably have intrinsic viscosities of about 0.50 to 0.55 measured on solutions of 1.0, 0.5, and 0.33 percent in chloroform, 25° C. and melt viscosities of 4,000 to 15,000 centi seconds by the test procedures of U.S. Pat. No. 4,465,820 at Col. 4, line 15-35.

The branched polycarbonates according to the invention can be used for both processing by extrusion, and injection molding, and particularly for the manufacture of hollow articles and large panels by blow-molding processes which require materials possessing high melt strength and excellent shape retention of the extrudate.

The following detailed examples will serve to more fully illustrate the practice of preferred embodiments of the present invention. Such examples are intended to be for illustrative purposes only, and are not intended to limit the scope of this invention.

EXAMPLES 1-8

To illustrate the effect of THPE branching agent level on the properties of linear polycarbonate substrate, a series of melt condensations are performed in a Helicone mixer.

In Examples 1-6, 500 grams of a commercially available grade of linear BPA-polycarbonate was dry mixed with an amount of tetrabutylammonium tetraphenylborate catalyst sufficient to supply 0.025 mole percent borate, based upon the amount of substrate present, and indicated amounts of THPE branching agent. The mixtures are then placed in a Helicone at temperatures ranging from 270° C.-300° C. for 20 to 30 minutes, and the resulting branched polycarbonate thereafter extracted and evaluated for melt rheological properties of MIR and R*. The results are summarized in Table 1 below.

Comparative Examples 7 and 8 are also provided to illustrate similar properties of commercially available branched and linear polycarbonate, respectively, such that the desirable properties of the branched polycarbonates prepared in accordance with the present invention are fully demonstrated and appreciated.

TABLE 1

The Effect of Varying THPE Levels on Melt Properties of Resulting Branched Aryl Polycarbonates

| Example No. | THPE (mole %) | MIR[1] | 2 kg wt.[2] (grams) | R* ($T_{ref}$) |
|---|---|---|---|---|
| 1 | 0.6 | 2.37 | 0.260 | 4.3 (265° C.) |
| 2 | 0.8 | 3.05 | 0.217 | 5.0 (256° C.) |
| 3 | 1.0 | 2.67 | 0.263 | 5.0 (260° C.) |
| 4 | 1.2 | 2.39 | 0.292 | 5.0 (255° C.) |
| 5 | 1.4 | 2.71 | 0.351 | — |
| 6 | 1.6 | 2.51 | 0.468 | 5.2 (245° C.) |
| 7 | Comm. 150[3] | 2.42 | 0.147 | 3.8 (278° C.) |
| 8 | Comm. 130[4] | 1.35 | 0.381 | 1.5 |

[1]Determined as described in U.S. Pat. No. 4,415,722 Col. 6, lines 1-7.
[2]For a comparison of melt viscosity, the weight of sample extruded when a 2 kg weight is used to extrude the resultant polycarbonate from the melt indexer for 60 seconds is recorded for each sample.
[3]Prepared by adding trimellitic triacid chloride to a commercial interfacial polymerization of BPA polycarbonate, from General Electric Company.
[4]Linear BPA polycarbonate available from General Electric Company R* is defined as the ratio of the complex melt viscosity of a material at low shear (H/radian/sec) to that at high shear (as during extrusion, i.e. 100 radian/sec), typically 20,000 poise. R* is thus a measure of the shear thinning behavior of the polymer. Experience has taught that good blow molding performance is obtained when R* is equal to or greater than 3.5. R* values are obtained by determining the complex viscosity on a Rheometrics Dynamic Spectrometer at 3 different temperatures (typically 230, 250, and 270° C.). Using this data fitted to the Arrhenius equation, the optimum processing extrusion temperature is calculated, i.e., that temperature at which the melt viscosity is 20,000 poise at 100 radian/sec. Then, the viscosity at low shear is calculated at this temperature. R* is then calculated by dividing this viscosity by 20,000 poise.

The results of Examples 1-6 especially the results of R* and 2 kg wt. and Comparative Examples 7-8 indicate that any of the levels of THPE examined produce a branched polycarbonate material displaying significantly higher properties than those of the non-branched resin Comm. 130, and properties somewhat better than those displayed by the branched polycarbonate Comm. 150 prepared by conventional interfacial technology.

EXAMPLES 9-11

Additional dry mixtures such as described in Examples 1-6 above were prepared in Examples 9 and 10 and the melt equilibrium thereafter carried out in an extruder which has a very short residence time compared to a Helicone. In comparative Example 11, Lexan ®130 is extruded. The melt rheological properties of all materials summarized in Table 2 below.

TABLE 2

| | Melt Properties of Extruded Material | | | |
|---|---|---|---|---|
| Example No | THPE (mole %) | MIR | 2K6 Wt. | R* (at temp.) | IV |
| 9 | 0.5 | 2.12 | .423 | 3.04 (257° C.) | .541 |
| 10 | 1.0 | 2.50 | .589 | 4.02 (243° C.) | .495 |
| 11 | .0 | 1.35 | .381 | | .600 |

The results of Table 2 further demonstrate the desirable melt rheological properties of branched polycarbonates prepared by extrusion methods in accordance with the present invention. Further GPC analysis of the extruded pellets compared with GPC analysis of the same material after heating at 270° C. for 10 minutes in a melt indexer indicates that the material completely equilibrated in the extruder and thus had completely reacted. Moreover, thermal aging tests performed on the extruded material on a melt rheometer for 60 minutes at 300° C. indicate the extruded material prepared in accordance with present invention to be thermally stable.

EXAMPLE 12

The following example illustrates the formulation, blending and extrusion procedures used to prepare the branched polycarbonates of the present invention from commercially available branched polycarbonate resins.

About 375 grams of Lexan ®150 grade resin, i.e., a branched polycarbonate resin available from General Electric Company, were placed in a 3 gallon Henschel Mixer. To this was added 2.27 grams of THPE, 0.207 grams of borate, and an additional 375 grams of Lexan ®150 resin, the total weight of Lexan ®150 resin being 750 grams. The mixture was blended for 30 seconds.

This formulation was then placed in a hopper-feeder which delivered the material to a WP 28mm twin screw extruder, the barrel temperatures of which were maintained at 300° C., at a rate of 13.5 pounds per hour. A two minute purge was used before material was collected.

COMPARATIVE EXAMPLE 13 AND EXAMPLES 14-19

Comparative Example 13 and Examples 14-19 illustrate the effect of THPE on the melt index ratio (MIR) of Lexan ®150 grade resin.

In Comparative Example 13, the Lexan ®150 resin was left untreated. In Examples 14-19, the resin was treated according to the procedure described in Example 12 above with various amounts of THPE and 0.207 grams of borate.

The extrudate formed in each of the examples was pelletized and evaluated for melt strength. The results are shown in Table 3 below.

TABLE 3

| Effect of THPE on the MIR of Lexan ®150 Polycarbonate | | | | | |
|---|---|---|---|---|---|
| Example # | Lexan ®150 | THPE (Mole %)[a] | NB | MIR | @ T (°C.) |
| Comp. 13 | 750 g | 0.00 g (0.000) | 0 | 2.23 | 270 |
| 14 | " | 1.13 g (0.125) | 0.207 g | 2.38 | 270 |
| 15 | " | 2.27 g (0.250) | " | 2.49 | 260 |
| 16 | " | 3.40 g (0.375) | " | 2.74 | 260 |
| 17 | " | 4.53 g (0.500) | " | 2.73 | 260 |
| 18 | " | 6.80 g (0.750) | " | 2.83 | 260 |
| 19 | " | 9.06 g (1.000) | " | 2.70 | 250 |

[a]Based on BPA-Carbonate Repeat Unit

It can be seen from the data shown in Table 3 that the use of as little as 0.250 mole% of THPE produces a branched resin with an MIR value of 2.5 and the use of higher THPE levels provides higher MIR values.

While the present invention has been described with reference to particular embodiments thereof, it will be understood that numerous modifications may be made by those skilled in the art without actually departing from the spirit and scope of the invention as defined in the appended claims.

What is claimed is:

1. A process for the preparation of a thermoplastic, branched-chain, polycarbonate which comprises reacting a branched aromatic polycarbonate with a polyhydric phenol having more than two hydroxy groups per molecule in the presence of a catalytic amount of a carbonate equilibration catalyst.

2. The process of claim 1 wherein the polyhydric phenol is 1,1,1-tris-(4-hydroxyphenyl)ethane and the carbonate equilibrium catalyst is selected from the group consisting of tetrabutylammonium tetraphenylborate, tetramethylammonium tetraphenylborate, lithium tetraphenylborate, sodium tetraphenylborate, sodium bis (2,2'-biphenylene)borate, potassium tetraphenylborate, tetramethylphosphonium tetraphenylborate, tetra-n-butylphosphonium tetraphenylborate and tetraphenylphosphonium tetraphenylborate.

3. The process of claim 2 wherein the carbonate equilibrium catalyst is tetrabutylammonium tetraphenylborate.

4. The process of claim 2 wherein the polyhydric phenol is present in an amount of from about 0.1 to about 2.0 mole percent, and the catalyst is present in an amount of from about 0.01 to about 0.1 mole percent, based on the amount of branched aromatic polycarbonate substrate.

5. The process of claim 1 wherein the thermoplastic branched-chain polycarbonate is prepared by melt condensation at a temperature of from about 200° C. to about 350° C. for about 1 to about 30 minutes.

6. The process of claim 1 wherein the thermoplastic branched-chain polycarbonate is prepared in an extrusion process at a temperature of from about 200° C. to about 350° C.

7. A process for the preparation of a thermoplastic, branched-chain polycarbonate having a melt index ratio of at least 2.0 and a complex viscosity ratio of at least 3.0 which comprises contacting a branched aromatic polycarbonate having a number average molecular weight of about from 6000 to about 50,000 with a polyhydric phenol having more than two hydroxy groups per molecule in the presence of a catalytic amount of a carbonate equilibration catalyst.

* * * * *